United States Patent
Barr et al.

(10) Patent No.: US 9,511,652 B2
(45) Date of Patent: Dec. 6, 2016

(54) INTEGRATED MODULE CARRIER PLATE

(75) Inventors: Geoffrey Barr, Troy, MI (US); Fred L. Sawgle, Lapeer, MI (US); Kenneth M. Easter, Troy, MI (US)

(73) Assignee: INTEVA PRODUCTS LLC, Troy, MI (US)

( * ) Notice: Subject to any disclaimer, the term of this patent is extended or adjusted under 35 U.S.C. 154(b) by 1572 days.

(21) Appl. No.: 12/784,260

(22) Filed: May 20, 2010

(65) Prior Publication Data

US 2011/0023367 A1    Feb. 3, 2011

Related U.S. Application Data

(60) Provisional application No. 61/179,929, filed on May 20, 2009.

(51) Int. Cl.
*B60J 5/04* (2006.01)

(52) U.S. Cl.
CPC .................... *B60J 5/0416* (2013.01)

(58) Field of Classification Search
CPC ........... B60J 5/0416; E05Y 2900/55; E05Y 2201/654; E05Y 2201/668; E05F 11/488; E05F 11/483; E05F 11/385; E05F 15/689
USPC ..... 49/502, 348, 349, 352; 296/146.5, 146.7
See application file for complete search history.

(56) References Cited

U.S. PATENT DOCUMENTS

| | | | |
|---|---|---|---|
| 3,678,964 A | 7/1972 | Andrews | |
| 4,937,977 A * | 7/1990 | Gergoe et al. | 49/352 |
| 5,251,403 A * | 10/1993 | Compeau et al. | 49/502 |
| 5,469,663 A * | 11/1995 | TenBrink et al. | 49/375 |
| 5,535,553 A | 7/1996 | Staser et al. | |
| 5,809,695 A * | 9/1998 | Strickland | 49/352 |
| 6,301,835 B1 * | 10/2001 | Pfeiffer et al. | 49/502 |
| 6,354,652 B1 * | 3/2002 | Arquevaux et al. | 296/146.5 |
| 6,536,164 B1 * | 3/2003 | Kirejczyk | 49/502 |
| 6,688,043 B1 * | 2/2004 | Feder et al. | 49/352 |
| 6,805,397 B1 * | 10/2004 | Chernoff et al. | 296/146.2 |
| 6,820,370 B2 * | 11/2004 | Marscholl | 49/352 |
| 6,862,846 B1 | 3/2005 | Kirejczyk | |
| 7,047,692 B2 * | 5/2006 | Benoit et al. | 49/352 |
| 7,490,438 B1 * | 2/2009 | Maass et al. | 49/502 |
| 7,882,658 B2 * | 2/2011 | Staser et al. | 49/352 |
| 2001/0037607 A1 * | 11/2001 | Pfeiffer et al. | 49/502 |
| 2002/0092243 A1 * | 7/2002 | Maass et al. | 49/501 |
| 2003/0066244 A1 | 4/2003 | Staser et al. | |
| 2003/0097796 A1 * | 5/2003 | Schutt et al. | 49/502 |
| 2003/0097798 A1 | 5/2003 | Staser | |

(Continued)

FOREIGN PATENT DOCUMENTS

| JP | 62189921 U | 12/1987 |
|---|---|---|
| JP | 2003170741 A | 6/2003 |

OTHER PUBLICATIONS

International Search Report dated Jan. 28, 2011 for International Application No. PCT/US2010/035629.

(Continued)

*Primary Examiner* — Justin Rephann
(74) *Attorney, Agent, or Firm* — Cantor Colburn LLP (57) ABSTRACT

A plastic carrier plate for vehicle door is provided. The plastic carrier plate having: a channel structure molded into the plastic carrier plate, the channel structure having a pair channels integrally molded into the plastic carrier plate, wherein the channels provide structural reinforcement to the plastic carrier plate and the channels intersect each other.

19 Claims, 4 Drawing Sheets

(56) References Cited

U.S. PATENT DOCUMENTS

| | | |
|---|---|---|
| 2003/0140562 A1 | 7/2003 | Staser et al. |
| 2004/0060240 A1 | 4/2004 | Fellner |
| 2005/0016071 A1* | 1/2005 | Takeda et al. .................. 49/352 |
| 2006/0037247 A1* | 2/2006 | Heyer et al. .................... 49/352 |
| 2006/0037250 A1 | 2/2006 | Staser |
| 2006/0196122 A1* | 9/2006 | Urieta et al. .................... 49/502 |
| 2006/0283091 A1* | 12/2006 | Papi et al. ...................... 49/502 |
| 2007/0289222 A1* | 12/2007 | Papi et al. ...................... 49/502 |
| 2008/0098655 A1* | 5/2008 | Valentage ....................... 49/352 |
| 2008/0222962 A1 | 9/2008 | Staser et al. |
| 2008/0263959 A1* | 10/2008 | Brauer et al. .................. 49/349 |
| 2008/0276541 A1* | 11/2008 | Roy et al. ....................... 49/502 |
| 2009/0000203 A1* | 1/2009 | Kirejczyk ...................... 49/352 |
| 2009/0134658 A1* | 5/2009 | Hanna ........................ 296/146.5 |
| 2010/0024306 A1 | 2/2010 | Staser |
| 2011/0010999 A1* | 1/2011 | Broadhead et al. ............ 49/352 |

OTHER PUBLICATIONS

Written Opinion dated Jan. 28, 2011 for International Application No. PCT/US2010/035629.

* cited by examiner

INTEGRATED MODULE CARRIER PLATE

CROSS REFERENCE TO RELATED APPLICATIONS

This application claims the benefit of U.S. Provisional Patent Application Ser. No. 61/179,929 filed May 20, 2009 the contents of which are incorporated herein by reference thereto.

BACKGROUND

Exemplary embodiments of the present invention relate to assemblies for vehicle doors and more particularly to a carrier plate for a vehicle door.

Cable drive window lift systems are usually mounted to a vehicle carrier plate however, such systems require structural stability and securement features that typically add to the cost and complexity of the totally window lift system.

Accordingly, it is desirable to provide a carrier plate that is constructed with features that address functional requirements of the carrier plate.

SUMMARY OF THE INVENTION

In accordance with an exemplary embodiment of the present invention, a plastic carrier plate for vehicle door is provided. The plastic carrier plate having: a channel structure molded into the plastic carrier plate, the channel structure having a pair channels integrally molded into the plastic carrier plate, wherein the channels provide structural reinforcement to the plastic carrier plate and the channels intersect each other.

In another embodiment a plastic carrier plate in combination with a conduitless window lift system is provided. The plastic carrier plate having: a channel structure molded into the plastic carrier plate, the channel structure having a pair channels integrally molded into the plastic carrier plate, wherein the channels provide structural reinforcement to the plastic carrier plate and the channels intersect each other; a pair of guide rails secured to the plastic carrier plate by self locking integral features integrally molded into the plastic carrier plate to provide a means of securement for the pair of guide rails to the plastic carrier plate without any other securement features other than the self locking integral features integrally molded into the plastic carrier plate; a motor for driving a cable drum rotationally received within a drum housing integrally molded with the plastic carrier plate; at least one cable secured to cable drum and rotationally received on at least one pulley rotationally snap fit into at least one of a plurality of pulley supports each being integrally molded into the plastic carrier plate proximate to a distal end of at least one of the pair of channels; and a cable ride feature integrally molded into the plastic carrier plate, wherein the cable ride feature is located on top of one of the pair of channels and has at least a pair of retaining lips extending upwardly from a ride surface of the cable ride feature, wherein the pair of retaining lips are located in a facing spaced relationship.

In still another embodiment, a method of forming a carrier plate for a vehicle door is provided. The method including the steps of: integrally molding a plurality of plastic features to a surface of the carrier plate, wherein the carrier plate itself is also molded from plastic and wherein the plurality of plastic features include: a channel structure molded into the carrier plate, the channel structure having a pair channels arranged in a crossing manner to provide structural support to the carrier plate; a plurality of pulley supports each being located proximate to a distal end of one of the pair of channels, wherein the pulley supports are configured to have pulleys snap fit therein; a cable ride feature located above one of the pair of channels, the cable ride feature being configured to elevate a portion of a cable above another portion of the cable travelling along the pulleys.

Although the drawings represent varied embodiments and features of the present invention, the drawings are not necessarily to scale and certain features may be exaggerated in order to illustrate and explain exemplary embodiments the present invention. The exemplification set forth herein illustrates several aspects of the invention, in one form, and such exemplification is not to be construed as limiting the scope of the invention in any manner.

DETAILED DESCRIPTION OF EXEMPLARY EMBODIMENTS

Referring to the attached FIGS. exemplary embodiments of the present invention are illustrated and relate to a carrier plate or door module for a vehicle door. Reference is also made to U.S. Patent Publication Nos. US20030066244 filed Feb. 5, 2002; US2003/0097798 filed Nov. 25, 2002; US20030140562 filed Jun. 25, 2002; US20060037250 filed Oct. 27, 2005; US20080222962 filed Mar. 12, 2008; and U.S. Patent Publication No. US20100024306 filed Jul. 31, 2009; and U.S. Pat. No. 5,535,553, the contents each of which are incorporated herein by reference thereto In accordance with an exemplary embodiment of the present invention, a carrier plate 10 for a vehicle is provided. In one exemplary embodiment, the carrier plate is molded from a material such as plastic or equivalents thereof. In one non-limiting exemplary embodiment and where applicable, the carrier plate and components of the carrier plate are manufactured from an easily molded or formed such as plastic, composite materials and/or equivalents thereof.

Figure 1:
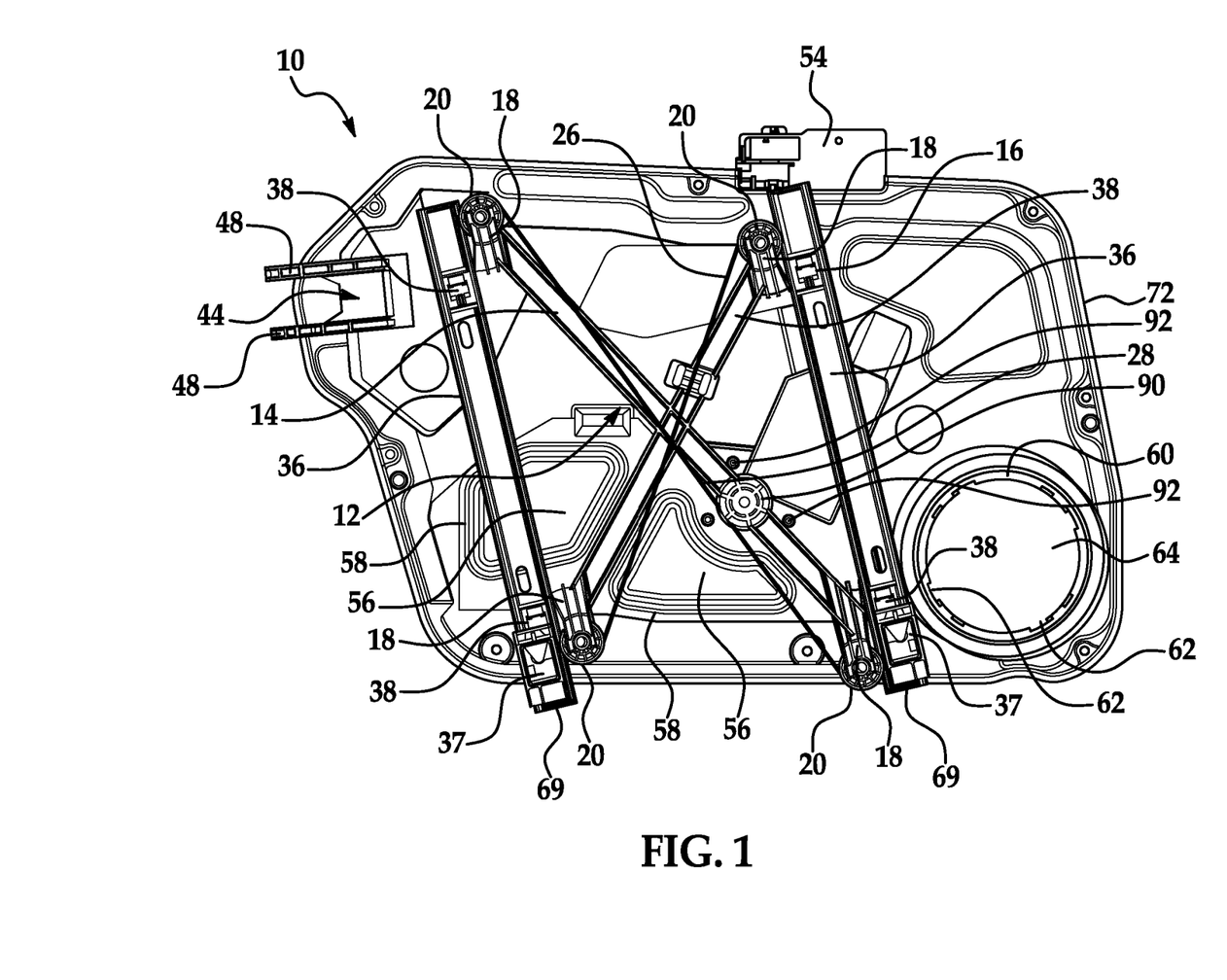
FIG. 1 is a side view of a structural plastic carrier plate in accordance with an exemplary embodiment of the present invention.
Figure 2:
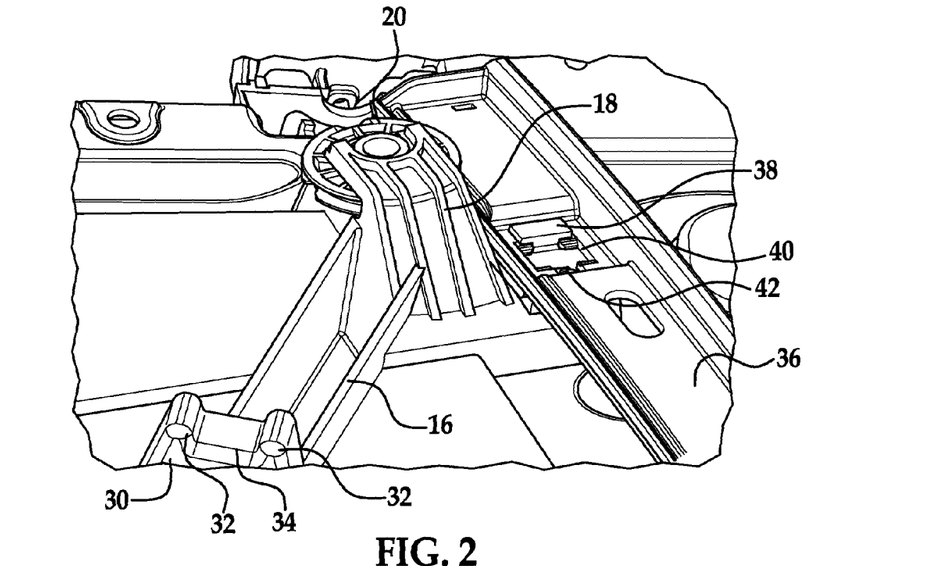
FIG. 2 is an enlarged perspective view of the structural carrier plate illustrated in FIG. 1.

In order to reduce complexity and cost to a vehicle carrier plate/window lift system, a conduitless dual rail window lift system is desired however, conduitless dual rail door modules are subject to different high load conditions than a conduited design. At least FIG. 1 illustrates one conduitless cable system or conduitless dual rail window lift system 19 contemplated for use with the plastic carrier plate illustrated herein. In accordance with an exemplary embodiment of the present invention and in order to provide a structural plastic carrier plate 10 that will resist the stall loads and resultant high temperature plastic creep for a conduitless cable system, a structural feature 12 is incorporated into the molded carrier plate to resist the offset column loading and to reduce the stress levels to below the high temperature creep threshold levels for the material selected for the molding of the carrier plate.

As illustrated in at least FIGS. 1-4 an X shaped channel structure 12 is molded into the molded carrier plate, thus enabling a cable design without a Bowden cable conduit (See for example U.S. Pat. No. 3,678,964). Although, the term "X channel" is used herein exemplary embodiments of the present invention contemplate structures similarly in shape to an X channel structure and/or other structures that have channels that cross each other to provide the desired effects and/or performances. The X channel structure has a pair channels 14 and 16 integrally molded into the carrier plate. Each channel 14, 16 is defined by a pair of spaced side walls 11 and a bottom portion 15. The side walls extend from the bottom portion to define the openings of the channels 14 and 16.

In an exemplary embodiment the height and thickness of the side walls of the channels provide structural reinforcement to the carrier plate such that deformation of the carrier plate due to the use of a conduitless cable system is prevented.

The X channel structure is designed to reduce the offset column stress at stall to a level compatible with the high temperature creep properties of the carrier material. This allows the operation of the conduitless system without excessive cable spring deflections as the structure deforms. Accordingly, the channel structure 12 prevents the carrier plate from deforming due to cable loads or other conditions that affect the tension of the cables of the window lift system thereby affecting performance of the same.

Figure 3:
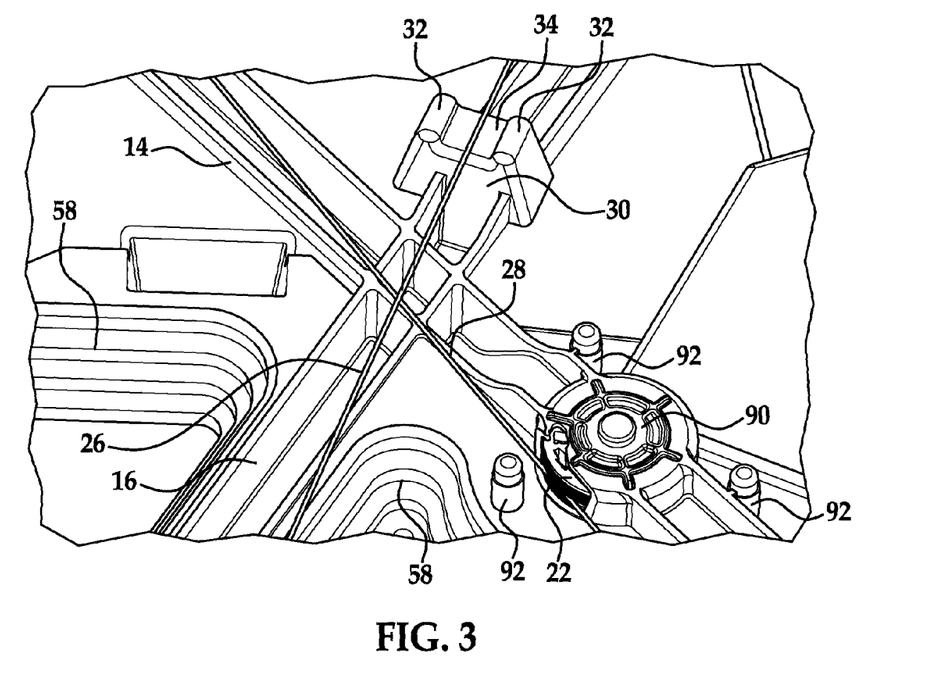
FIG. 3 is an enlarged perspective view of the structural carrier plate illustrated in FIG. 1.
Figure 3A:
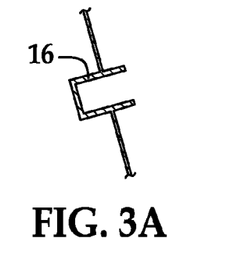
FIG. 3A is a cross-sectional view of a portion of the structural carrier plate having a channel.
Figure 4:
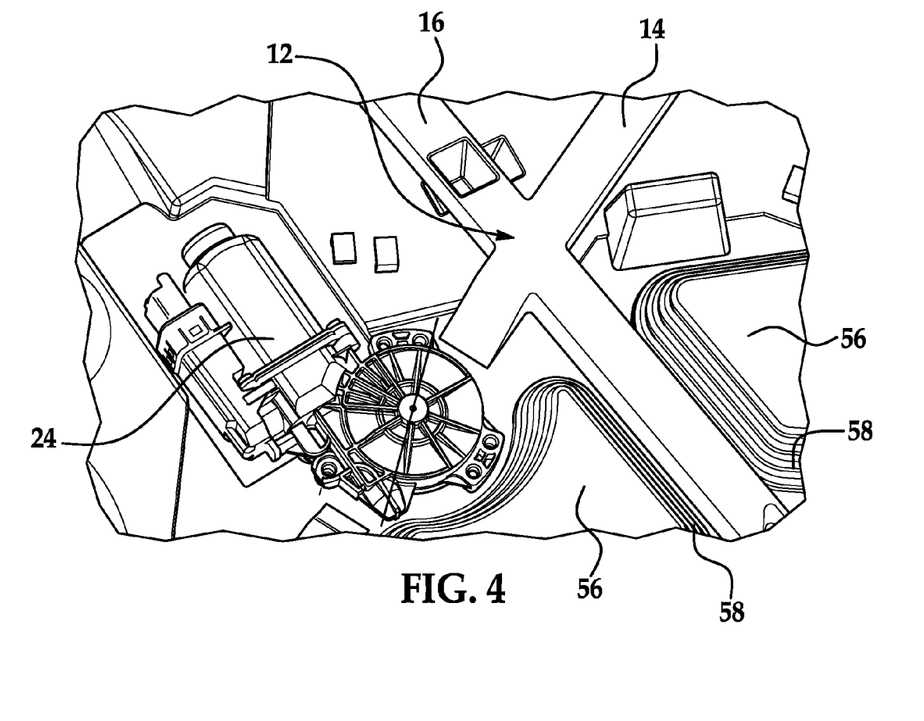
FIG. 4 is an enlarged perspective view of an opposite side of the structural carrier plate illustrated in FIG. 1.

In one embodiment and as illustrated in FIG. 3A the sidewalls 11 extend away from both an inboard and an outboard side of a main surface 17 of the carrier plate. In this configuration, the bottom is located away from one surface of main surface 17 and the distal ends of the sidewalls defining the opening of channels 14 and 16 are located away from an opposite surface of the main surface. Of course, other configurations are contemplated to be within the scope of exemplary embodiments of the present invention.

In one exemplary embodiment, the channel structure is joined to pulley supports 18 or each channel terminates at a pulley support 18 to provide a continuous load path with no localized areas of high stress. In one non-limiting exemplary embodiment, the pulley supports 18 are integrally molded into the carrier plate and are configured to have pulleys 20 snap fit therein thus providing an integrated pulley structure with a minimal amount of components as well as ease of manufacture. In other words the pulley supports are configured to have pulleys rotationally snap fit therein without any other securement means. An example of snap-fitted pulleys is found in U.S. Patent Publication No. 2008/0222962 filed Sep. 18, 2008, the contents of which are incorporated herein by reference thereto.

In another exemplary embodiment and in order to implement a conduitless dual rail door module design with high durability, it is necessary to design the pulleys 20 and a cable drum 22 of a cable drive unit 24 with minimum cable fleet angles and to provide adequate clearance where the two cables 26 and 28 cross in the center of the module or carrier plate. In order to provide the clearance during all cable positions on the driving drum 22, a ride feature 30 is integrally molded into the carrier plate. In one embodiment, the cable ride feature is located on top of one of the channels to provide adequate clearance between cables 26 and 28 as they ride on the cable drum and the height of the cables with respect to a surface of the carrier plate changes. Of course, other location of the cable ride feature are contemplated.

In other words, as the cable height changes with respect to the carrier plate (e.g., as the cable wraps onto and off of cable drum 22) ride feature 30 keeps the two cables a sufficient distance away from each other. The addition of this ride feature enables the use of a conduitless cable in a dual rail cable design with a minimum door thickness and to reduce cable rattles during door slam.

According to this embodiment, the cable ride feature is integrated into the molded carrier plate, thus ensuring adequate cable separation and enabling a cable design without a Bowden cable conduit or equivalents thereof. As illustrated, the ride feature 30 is designed with retaining lips 32 and a ride surface 34 that has a large radius to minimize cable stress and wear. Accordingly, the cable may move along the ride surface without engaging the retaining lips.

Cable drive window lift systems usually have one or two guide rails 36 which serve the functions of guiding the glass in three dimensions as it rides in carriers 37 that travel up and down in the guide rails as the cable or cables 26, 28 are wrapped onto and off of cable drum 22 (e.g., the carriers are attached to the cables). The attachments of the guide rails are made either to the door inner panel, or to a metal or composite door module carrier plate.

These attachments are almost always by threaded fasteners or rivets. These fasteners have a piece cost and assembly cost associated with the installation. Accordingly, it is desirable to reduce this assembly cost.

In one exemplary embodiment and in order to negate the need for threaded fasteners or other equivalent items for securing the guide rails to the carrier plate and referring now to at least FIGS. 1-7, self locking integral hooks or tee features 38 are integrally molded into the carrier plate to provide the joint between the rail(s) and the mounting surface of the carrier plate. Accordingly, the self locking integral features integrally molded into the plastic carrier plate provide a means of securement for the guide rails to the plastic carrier plate without any other securement features other than the self locking integral features integrally molded into the plastic carrier plate.

Figure 6:
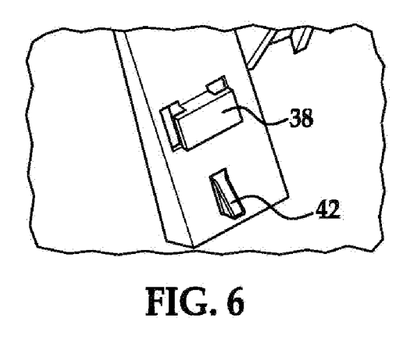
FIGS. 6 and 7 are enlarged perspective views of a guide rail attachment feature of an embodiment of the structural carrier plate illustrated in FIG. 1.
Figure 7:
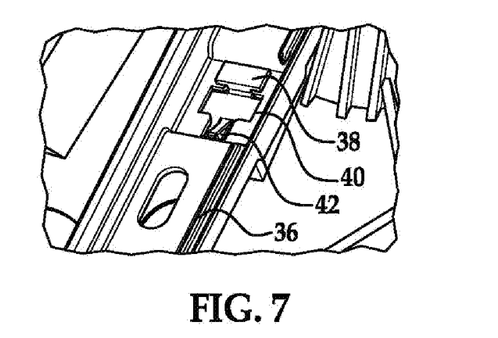

These projections engage a slot or tee slot 40 in the adjacent part (e.g., guide rail). In addition, a locking feature 42 is also provided to engage the rail to the carrier plate. The engagement features can be oriented so that the projections and the opening can be in either part (e.g., carrier plate or guide rail) and in either longitudinal or vertical orientation or other orientation as long as the desired support is provided. In addition and in order to provide ease of insertion of the locking feature 42 into the guide rail, the locking feature has an angled surface 41 and a wall engaging portion 43. Of course, other configurations for the locking features are considered to be within the scope of exemplary embodiments of the present invention. In one non-limiting embodiment, the features are located proximate or adjacent to pulley supports 18. In still another embodiment, the guide rails may also be formed from a plastic or composite material. Of course, other materials including metals are contemplated for the use for forming the guide rails.

In the sample shown with a composite rail, the tee features are shown in the rail with the aperture in the mounting surface of the supporting structure (composite door module in this case).

The snap locking feature is in the rail and is also positioned so that the down glass stall forces are reacted directly by the tee feature in the slot. In other words, the feature is configured such that downward forces contact the feature to provide additional support as the window travels downward along guide rails 36. The snap feature provides secure location in the design position.

The costs associated with the snap feature invention are zero piece cost and reduced installation labor cost in that no additional features (e.g., bolts, screws, rivets, etc.) are required.

Referring now to at least FIGS. 1-8 and in the design of a door module which includes an attached latch, it is known that adjustment for build variation in the various axes has to be accommodated. The commonly implemented solution is to add a separate latch retainer mechanically attached to the module carrier plate. However, separate latch retainers and their securement add additional costs to the module.

Figure 5:
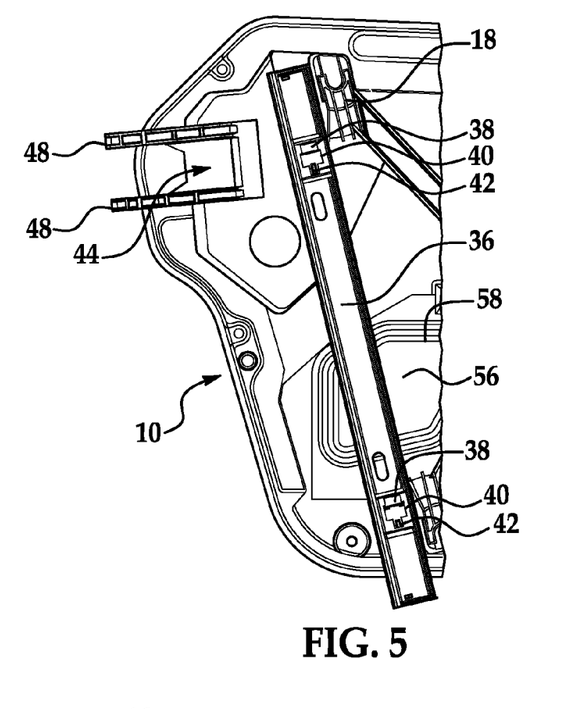
FIG. 5 is a partial side view of a structural carrier plate in accordance with an exemplary embodiment of the present invention.
Figure 8:
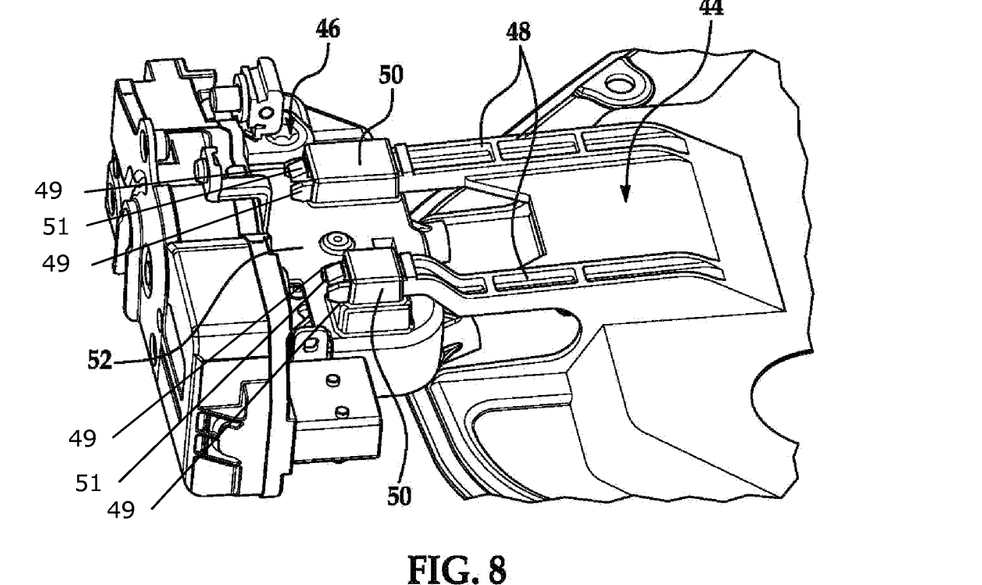
FIG. 8 is an enlarged perspective view of the structural carrier plate illustrated in FIG. 1.

Therefore and in still another exemplary embodiment and referring to at least FIGS. 1, 5 and 8, a latch retainer 44 is integrated or integrally molded into the molded carrier plate, thus saving the separate part cost and the cost of attachment. By integrating the retainer into the molded carrier plate, additional savings are provided by negating the separate part cost and the cost of the attachment of the separate part.

The longitudinal variations are accommodated by a sliding action of a latch 46 onto the integrated protrusion(s) 48 of the integral latch retainer 44. Lateral and vertical variation is allowed by deflection of arm members or equivalent structures 49 of the protrusion(s), wherein the features are robust and engineered to provide the required motion. For example, protrusions 48 each have two arm members 49 to allow for vertical variations with respect to the carrier plate and one arm member to allow for lateral variations or inboard and outboard variations or movement with respect to the carrier plate. Still further, the arm member 49 that allows for lateral variations is located between the upper and lower arm members and has an engagement feature 51 for engaging a portion of the latch secured thereto. Each of the arm members 49 extend away from protrusions 48 as sufficient distance to allow for the appropriate deflection of the arm members to allow for the required variations or tolerances.

Thus, the latch is retained by an integral snap fit feature engaging with a receiver 50 defining an opening in the latch housing 52 for receipt of the arm members therein. This integration is also achieved without affecting the sealing of the wet/dry carrier by means of a slide action in the molding tool and due the fact that a sealing member can be applied to the periphery of the carrier plate since the latch securement is not at the peripheral edge of the carrier plate. Moreover, an additional advantage is that the assembly recyclability is also improved with a single material in that the latch housing may be recycled with the carrier plate or the latch housing may be removed from the carrier plate. Still further and since the need for a separate securement bracket for the latch is removed recyclability is improved and costs are reduced since a separate component is no longer required.

In another exemplary embodiment and as an additional alternative feature and similar to the latch retainer an integrated handle bracket 54 (FIG. 1) is also provided for mounting a door handle to the carrier plate.

In another exemplary embodiment and as an additional alternative feature collapsible energy absorption features 56 (FIGS. 1 and 3-5) are provided in localized areas wherein the features will have a plurality of steps 58 configured for collapse during impact.

In still another exemplary embodiment and as an additional alternative feature, integral speaker mount blades 60 (FIG. 1) with features 62 for rotationally engaging a speaker mounted within opening 64 are provided or equivalents thereof.

In still another exemplary embodiment and as an additional alternative feature rubber down stops 69 (FIG. 1) are provided at the bottom of the guide rails, the down stops can be integral to the guide rails or positioned on the carrier plate. Moreover and in still another embodiment, the guide rails are also manufactured from a plastic material.

Figure 9:
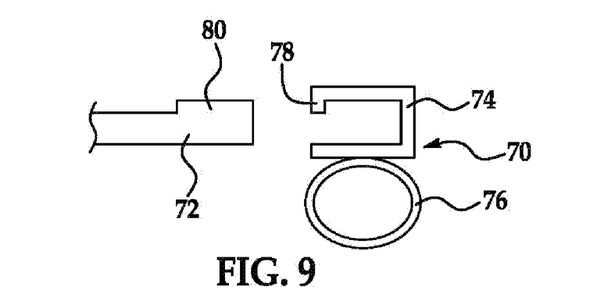
FIG. 9 is a cross-sectional view a sealing member and peripheral edge of a carrier plate illustrated in one non-limiting exemplary embodiment.

In still another embodiment and referring now to at least FIGS. 1 and 9, a sealing member 70 is secured along a peripheral portion 72 of the carrier plate. In one non-limiting exemplary embodiment sealing member 70 is co-extruded or formed with any other equivalent process wherein sealing member 70 has two materials each being of a different durometer. For example, a first portion 74 has a stiffer durometer while a second portion 76 has a softer durometer (e.g., the first portion secures the sealing member 70 while the second provides the sealing function). In one embodiment the first portion 74 has a feature 78 for engaging a complimentary feature 80 of the peripheral portion 72 of the carrier plate 10. This will allow the sealing member 70 to be easily installed to the periphery of the carrier plate by for example a rolling process or a hand applied process. In one embodiment, the sealing member will provide a continuous seal all the way around the periphery of the carrier plate except for the interruption provided by the integral handle bracket 54. Thus and as illustrated, the sealing member begins at one end of the handle bracket and then terminates at the other end of the handle bracket. Alternatively, the handle bracket may be removed or moved inboard and the sealing member will be provided continuously around the carrier plate. Non-limiting examples of the material contemplated for the first portion would be a polypropylene (PP) and the second portion would be a thermoplastic (TPE) or equivalents thereof.

Also shown in at least FIGS. 1 and 3 and in one non-limiting exemplary embodiment, a drum housing 90 for the cable drum 22 is also integrally molded into the carrier plate and securement features 92 for the motor drive unit are also integrally molded into the carrier plate. In one non-limiting configuration, the drum housing is located in the path of one of the structural channels.

In accordance with an exemplary embodiment of the present invention all or some of the aforementioned features may be incorporated or integrally molded into a carrier plate. Still further and in one embodiment, all or some of these features including the carrier plate and components integrally formed therewith and secured thereto are formed from an easily molded material such as plastic or a structurally reinforced plastic material.

As used herein, the terms "first," "second," and the like, herein do not denote any order, quantity, or importance, but rather are used to distinguish one element from another, and the terms "a" and "an" herein do not denote a limitation of quantity, but rather denote the presence of at least one of the referenced item. In addition, it is noted that the terms "bottom" and "top" are used herein, unless otherwise noted, merely for convenience of description, and are not limited to any one position or spatial orientation.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A plastic carrier plate for a vehicle door, wherein the plastic carrier plate has a main surface: and
   a channel structure molded into the plastic carrier plate, the channel structure having a pair channels integrally molded into the main surface of the plastic carrier plate, wherein the channels provide structural reinforcement to the plastic carrier plate and the channels intersect each other and wherein the main surface extends outwardly and away from the pair of channels, wherein the plastic carrier plate further comprises a plurality of pulley supports each being integrally molded into the plastic carrier plate and located proximate to a distal end of at least one of the pair of channels and wherein the pulley supports are configured to have pulleys rotationally snap fit therein without any other securement means.

2. The plastic carrier plate as in claim 1, wherein the plastic carrier plate further comprises a cable ride feature integrally molded into the plastic carrier plate.

3. The plastic carrier plate as in claim 2, wherein the cable ride feature has at least a pair of retaining lips extending upwardly from a ride surface of the cable ride feature, wherein the pair of retaining lips are located in a facing spaced relationship.

4. The plastic carrier plate as in claim 1, wherein the plastic carrier plate further comprises self locking integral features integrally molded into the plastic carrier plate to provide a means of securement for at least one guide rail to the plastic carrier plate without any other securement features other than the self locking integral features integrally molded into the plastic carrier plate.

5. The plastic carrier plate as in claim 4, wherein the self locking integral features are also molded from plastic.

6. The plastic carrier plate as in claim 1, wherein the plastic carrier plate further comprises self locking integral features integrally molded into the carrier plate to provide a means of securement of at least one guide rail to the carrier plate without any other securement features other than the self locking integral features integrally molded into the plastic carrier plate and wherein the carrier plate further comprises a cable ride feature integrally molded into the plastic carrier plate.

7. The plastic carrier plate as in claim 6, wherein each of the pair of channels is defined by a pair of spaced side walls and a bottom portion, wherein the pair of spaced side walls extend from the bottom portion to define openings of each of the pair of channels and wherein a height and thickness of the pair of spaced side walls provide structural reinforcement to the carrier plate such that deformation of the plastic carrier plate due to the use of a conduitless cable system is prevented.

8. The plastic carrier plate as in claim 7, wherein each of the sidewalls of the pair of channels extend away from both an inboard and an outboard side of a main surface of the plastic carrier plate such that the bottom portion is located away from one surface of a main surface of the plastic carrier plate and distal ends of the sidewalls defining the openings of pair of channels are located away from an opposite surface of the main surface.

9. The plastic carrier plate as in claim 8, wherein the cable ride feature is located on top of one of the channels to provide adequate clearance between cables as they ride on a cable drum and a height of the cables with respect to a surface of the plastic carrier plate changes.

10. The plastic carrier plate as in claim 9, wherein the self locking integral features are configured to engage a slot in the at least one guide rail and the self locking integral features are located adjacent to at least one of the plurality of pulley supports.

11. The plastic carrier plate as in claim 10, wherein the slot is engaged by at least two self locking integral features, wherein one of the self locking features has an angled surface and a wall engaging portion.

12. The plastic carrier plate as in claim 11, further comprising a latch retainer integrally molded with the plastic carrier plate, wherein the latch retainer secures a latch to the plastic carrier plate and the latch retainer further comprises a pair of protrusions each having a plurality of arm members extending thereform, wherein at least one of the plurality of arm members allows for vertical deflection of the latch with respect to the plastic carrier plate and another one of the plurality of arm members allows for lateral deflection of the latch with respect to the plastic carrier plate.

13. The plastic carrier plate as in claim 1, further comprising a latch retainer integrally molded with the plastic carrier plate, wherein the latch retainer secures a latch to the plastic carrier plate and the latch retainer further comprises a pair of protrusions each having a plurality of arm members extending thereform, wherein at least one of the plurality of arm members allows for vertical deflection of the latch with respect to the plastic carrier plate and another one of the plurality of arm members allows for lateral deflection of the latch with respect to the plastic carrier plate.

14. A plastic carrier plate in combination with a conduitless window lift system, comprising:
   a channel structure molded into the plastic carrier plate, the channel structure having a pair channels integrally molded into the plastic carrier plate, wherein the channels provide structural reinforcement to the plastic carrier plate and the channels intersect each other;
   a pair of guide rails secured to the plastic carrier plate by self locking integral features integrally molded into the plastic carrier plate to provide a means of securement for the pair of guide rails to the plastic carrier plate without any other securement features other than the self locking integral features integrally molded into the plastic carrier plate;
   a motor for driving a cable drum rotationally received within a drum housing integrally molded with the plastic carrier plate;
   at least one cable secured to cable drum and rotationally received on at least one pulley rotationally snap fit into at least one of a plurality of pulley supports each being integrally molded into the plastic carrier plate proximate to a distal end of at least one of the pair of channels; and
   a cable ride feature integrally molded into the plastic carrier plate, wherein the cable ride feature is located on top of one of the pair of channels and has at least a pair of retaining lips extending upwardly from a ride surface of the cable ride feature, wherein the pair of retaining lips are located in a facing spaced relationship.

15. The plastic carrier plate as in claim 14, wherein each of the pair of channels is defined by a pair of spaced side walls and a bottom portion, wherein the side walls extend from the bottom portion to define openings of each of the pair of channels and wherein the height and thickness of the side walls of the channels provide structural reinforcement to the carrier plate such that deformation of the plastic carrier plate due to the use of the conduitless window lift is prevented.

16. The plastic carrier plate as in claim 15, wherein each of the sidewalls of the pair of channels extend away from both an inboard and an outboard side of a main surface of the plastic carrier plate such that the bottom portion is located away from one surface of a main surface of the plastic carrier plate and distal ends of the sidewalls defining the openings of pair of channels are located away from an opposite surface of the main surface.

17. The plastic carrier plate and conduitless window lift system of claim 14, wherein the plastic carrier plate has a main surface and the pair channels are integrally molded into the main surface of the plastic carrier plate and wherein the main surface extends outwardly and away from the pair of channels.

18. A plastic carrier plate for vehicle door, comprising:
a channel structure molded into the plastic carrier plate, the channel structure having a pair channels integrally molded into the plastic carrier plate, wherein the channels provide structural reinforcement to the plastic carrier plate and the channels intersect each other, wherein each of the pair of channels is defined by a pair of spaced side walls and a bottom portion, wherein the side walls extend from the bottom portion to define openings of each of the pair of channels and wherein the height and thickness of the side walls of the channels provide structural reinforcement to the carrier plate such that deformation of the plastic carrier plate due to the use of a conduitless cable system is prevented, wherein the plastic carrier plate further comprises a plurality of pulley supports each being integrally molded into the plastic carrier plate and located proximate to a distal end of at least one of the pair of channels and wherein the pulley supports are configured to have pulleys rotationally snap fit therein without any other securement means.

19. The plastic carrier plate as in claim 18, wherein each of the pair of channels is defined by a pair of spaced side walls and the main surface has an inboard side and an outboard side and the pair of spaced sidewalls extend upwardly and away from both the inboard side and an outboard side.

* * * * *